US005261234A

United States Patent [19]

Holloway et al.

[11] Patent Number: 5,261,234

[45] Date of Patent: Nov. 16, 1993

[54] HYDRAULIC CONTROL APPARATUS

[75] Inventors: Dwight S. Holloway, Chillicothe; Howard A. Marsden, Pekin, both of Ill.

[73] Assignee: Caterpillar Inc., Peoria, Ill.

[21] Appl. No.: 817,569

[22] Filed: Jan. 7, 1992

[51] Int. Cl.[5] .............................................. F16D 31/02

[52] U.S. Cl. ....................................... 60/462; 91/433; 137/625.65

[58] Field of Search ..................... 60/462, 463; 91/459, 91/461, 462, 433; 137/625.65

[56] References Cited

U.S. PATENT DOCUMENTS 3,821,625 6/1974 Scholl ................................. 318/624
4,031,813 6/1977 Walters et al. ......................... 91/433
4,336,745 6/1982 Lund ................................. 91/433 X
4,523,892 6/1985 Mitchell et al. ....................... 417/34
4,534,707 8/1985 Mitchell ................................ 417/34
4,712,376 12/1987 Handank ............................... 60/427
4,712,470 12/1987 Schmitz ................................ 91/433
4,718,329 1/1988 Nakajima et al. ...................... 91/445
4,896,582 1/1990 Tordenmalm et al. ........... 91/461 X
4,970,941 11/1990 Reinhardt ................. 137/625.65 X
5,138,838 8/1992 Crosser ............................ 60/462 X

FOREIGN PATENT DOCUMENTS

0235545B1 9/1990 European Pat. Off. .

*Primary Examiner*—Edward K. Look
*Assistant Examiner*—F. Daniel Lopez
*Attorney, Agent, or Firm*—James R. Yee

[57] ABSTRACT

An apparatus for controllably actuating a hydraulic actuator is provided. The apparatus is connected between a source of pressurized hydraulic fluid and the hydraulic actuator. The apparatus controllably provides pressurized hydraulic fluid to the hydraulic actuator. The apparatus includes a controller for receiving an operating signal and a load pressure signal and responsively actuating the hydraulic actuator.

8 Claims, 7 Drawing Sheets

HYDRAULIC CONTROL APPARATUS

TECHNICAL FIELD

This invention relates generally to an apparatus for controlling a hydraulic actuator and more particularly to an apparatus for controlling a hydraulic actuator using load pressure feedback.

BACKGROUND ART

Hydraulic drive systems are utilized in construction equipment such as hydraulic excavators, backhoe loaders, and end loaders. Known systems typically use a plurality of open center control valves to controllably actuate the various hydraulic actuators on the vehicle. Normally, such drive systems are controlled through a series of operator control levers which are coupled to the control valves mechanically or hydraulically. The open center control valves give the system a variable response which is dependent on the load on the actuator. In manually operated systems, this may be desirable because the variable response gives the operator an indication of the load on the actuator. The operator then has a better feel for the operation of the vehicle and can better adjust his/her manipulation of the control levers to achieve the desired result.

Recently, however, a lot of effort has gone into automating or semi-automating the functions of such vehicles. In these automatic or semi-automatic systems, the response characteristics of an open center valve is almost always undesirable. Such systems requires consistent response to ensure constant and predictable operation. One way to achieve constant and predictable results is to use a pressure compensated closed center valve. Pressure compensated valves use pressure feedback to achieve consistent response. However, the operator loses the sense or "feel" for the load.

It has also been found desirable in such systems to have drive systems which can exhibit both response characteristics. For example, for a system adapted to perform in manual and automatic modes, it may be desirable to have certain hydraulic circuits operating with open center response characteristics in the manual mode and operating with pressure compensated closed center response characteristics in the automatic mode.

The subject invention is directed at overcoming one or more of the problems as set forth above.

DISCLOSURE OF THE INVENTION

In one aspect of the present invention, an apparatus for controllably actuating a hydraulic actuator is provided. The apparatus is connected between a source of pressurized hydraulic fluid and the hydraulic actuator. The apparatus controllably provides pressurized hydraulic fluid to the hydraulic actuator. The apparatus includes a controller for receiving an operating signal and a load pressure signal and responsively actuating the hydraulic actuator.

In another aspect of the present invention, an apparatus for controllably actuating a hydraulic actuator is provided. The apparatus is connected between a source of pressurized hydraulic fluid and the hydraulic actuator. The apparatus controllably provides pressurized hydraulic fluid to the hydraulic actuator. The apparatus includes a controller for receiving an operating signal, a mode indicating signal, and a load pressure signal and responsively actuating the hydraulic actuator.

BEST MODE FOR CARRYING OUT THE INVENTION

Figure 1:
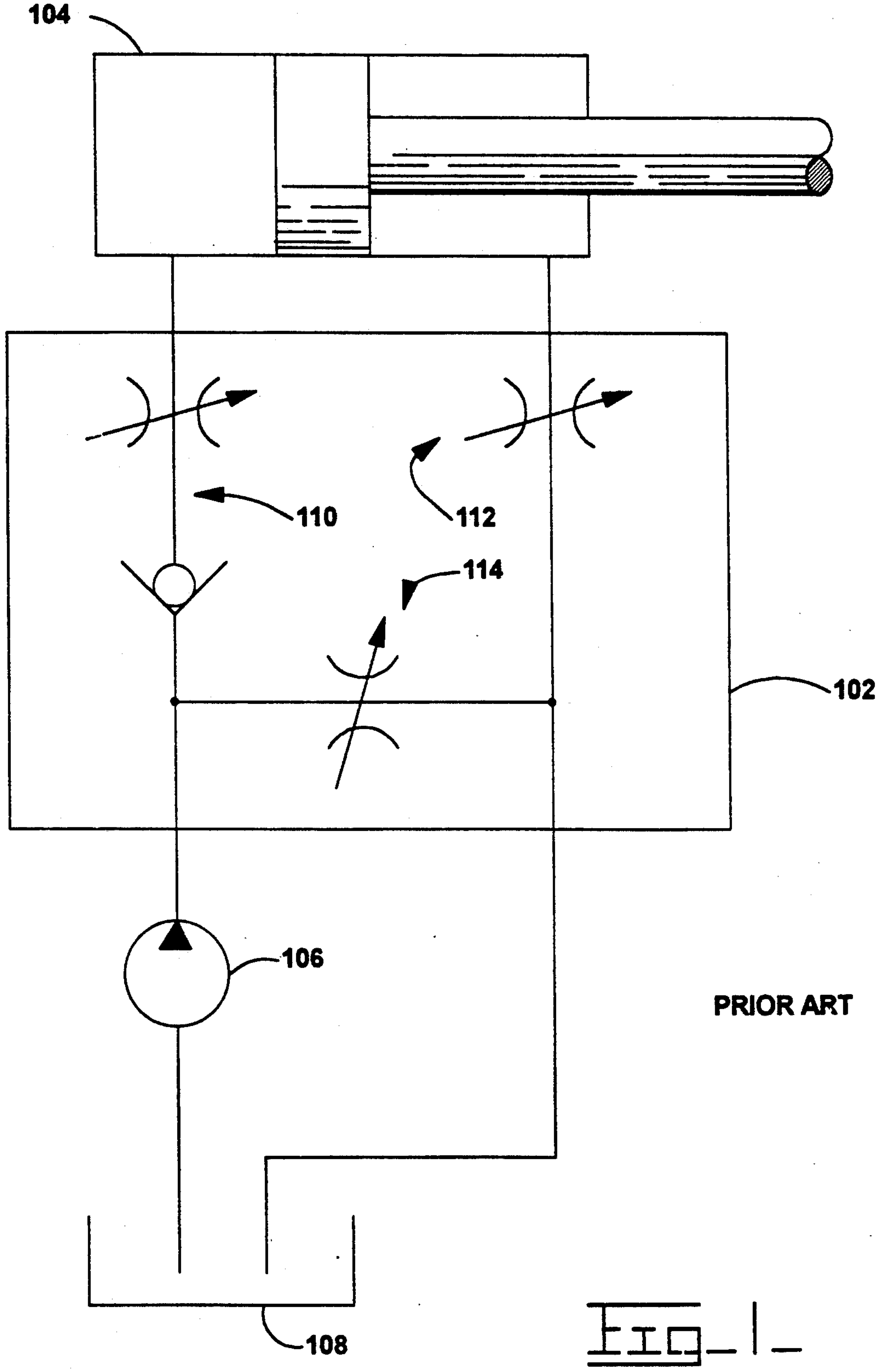
FIG. 1 is a stylized representation of a hydraulic circuit with a hydraulic actuator and an open center valve.

With reference to FIG. 1, a simplified hydraulic circuit employing a nonpressure compensated open center valve 102 is shown. The valve 102 is used to actuate a hydraulic actuator 104 and is connected between the actuator 104 and a pump/tank arrangement 106/108. The valve 102 is actuated by an operator control lever (not shown). Typically, the lever is mechanically or hydraulically coupled to the valve 102. Through operation of the control lever, the operator moves a spool within the valve, which opens and closes a number of orifices or slots within the valve, and thereby controls the flow of fluid to the hydraulic actuator 104. In the simplified valve 102 shown in FIG. 1, a first orifice 110 forms a pathway between the pump (P) 106 and the hydraulic actuator 104. A second orifice 112 forms a pathway between the hydraulic actuator 104 and the tank (T) 108. A third orifice 114 forms a pathway from the pump (P) to the tank (T).

Figure 2:
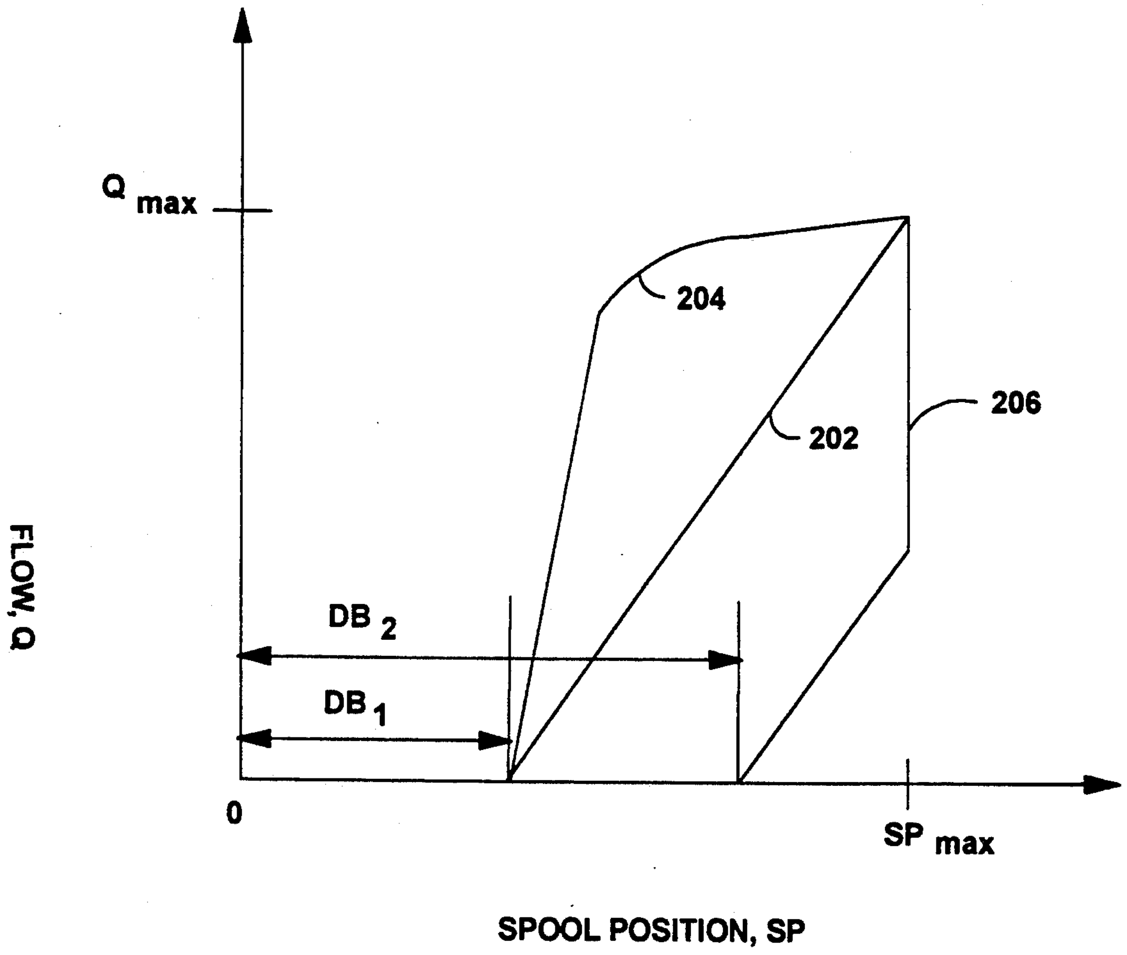
PRIOR ART Fig. 2
FIG. 2 is a graph illustrating the response of the hydraulic circuit of FIG. 1.

With reference to FIG. 2, the response of the hydraulic circuit of FIG. 1 varies as a function of the load on the hydraulic actuator 104. The traces of FIG. 2 illustrate the response of the valve or the flow of fluid to the actuator 104 as a function of the spool position. For example, the circuit is designed for a rated load. The response of the circuit under the rated or designed load is illustrated by a design load trace 202. The circuit exhibits a deadband, or range of spool positions for which there is no fluid flow to the actuator 104. The deadband for the rated load is designated by $DB_1$. For the rated load, the flow of fluid to the actuator for the rest of the range of spool positions is proportional to the spool position and is a function of the metering slot area. For simplicity, the flow is shown as linear, but the present invention is not limited to such.

However, if the load on the actuator 104 is less than the design load then the response changes. The response of the circuit under a light load is illustrated by a light load trace 204. As shown, under a light load, the fluid flow to the actuator 104 is greater than under the design load for the same spool position.

Likewise, if the load on the actuator is greater than the designed load, then the response also changes. The response of the circuit under a heavy load is illustrated by a heavy load trace 206. As shown, under a heavy load, the operator has to increase actuation of the lever and thereby increase the spool position to get the same response as under the design load. Furthermore, the deadband range is increased. The deadband under the heavy load is designated by $DB_2$.

Figure 3:
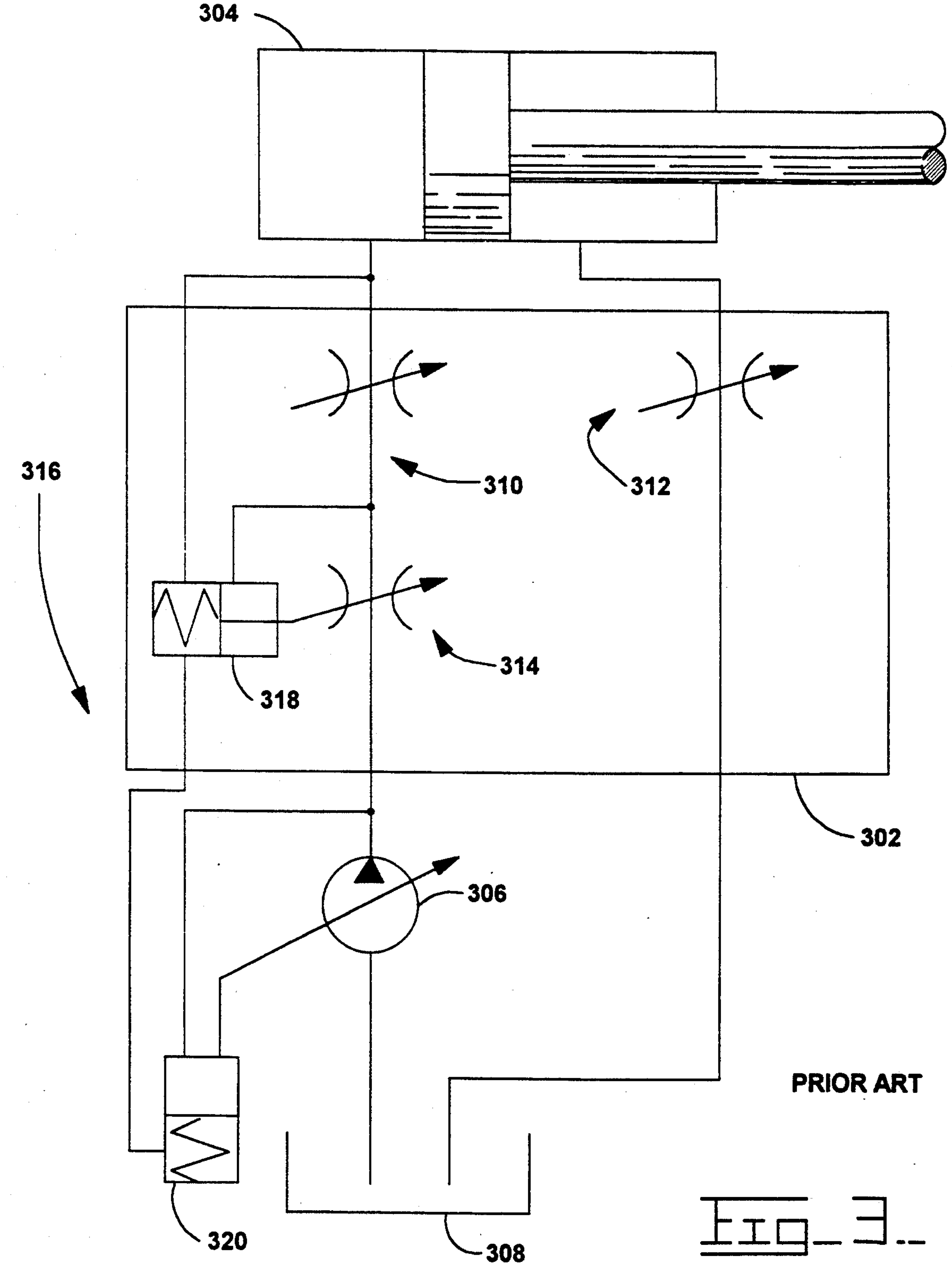
PRIOR ART Fig. 3
FIG. 3 is a stylized representation of a hydraulic circuit with a hydraulic actuator and a closed center pressure compensated valve.
Figure 4:
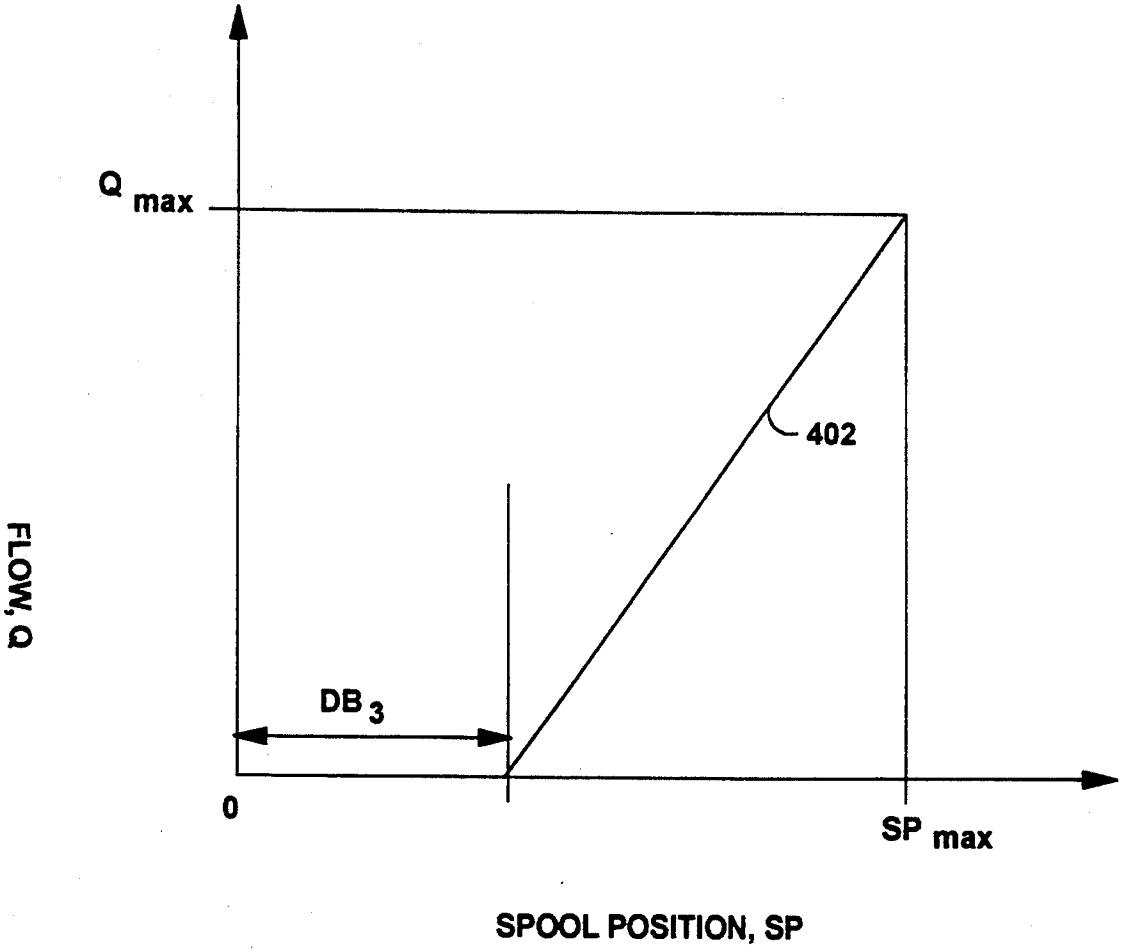
PRIOR ART Fig. 4
FIG. 4 is a graph illustrating the response of the hydraulic circuit of FIG. 3.

With reference to FIG. 3, a simplified hydraulic circuit employing a pressure compensated closed center valve 302 is shown. The valve 302 is used to actuate a hydraulic actuator 304 and is connected between the actuator 304 and a variable pump/tank arrangement 306/308. The valve 302 is actuated by an operator through a control lever (not shown). Typically, the lever is mechanically or hydraulically coupled to the valve 302. Through operation of the control lever, the operator moves a spool within the valve, which opens and closes a number of orifices within the valve, and thereby controls the flow of fluid to the hydraulic actuator 304. The valve 302 is pressure compensated to ensure a constant response independent of the load on the actuator 304. In the simplified valve 302 of FIG. 3, a first orifice 310 forms a pathway between the pump (P) and the hydraulic actuator 302. A second orifice 312 forms a pathway between the tank (T) and the hydraulic actuator 304. A means 316 provides pressure feedback to the valve. The feedback means 316 includes first and second compensators 318,320 and a third variable orifice 314. The first and second compensators 318,320 are adapted to control the metering slot area of the third variable orifice 314 and the output of the variable pump 306 as a function of the pressure within the hydraulic actuator 304. The feedback means 316 is adapted to give the valve 302 a constant response for all loads. The response of the valve 302 is shown in the graph of FIG. 4. The valve exhibits a constant deadband range, designated by $DB_3$. Furthermore, the flow of fluid to the actuator is linear with respect to the spool position for the rest of the spool position range as shown by the trace 402.

Figure 5A:
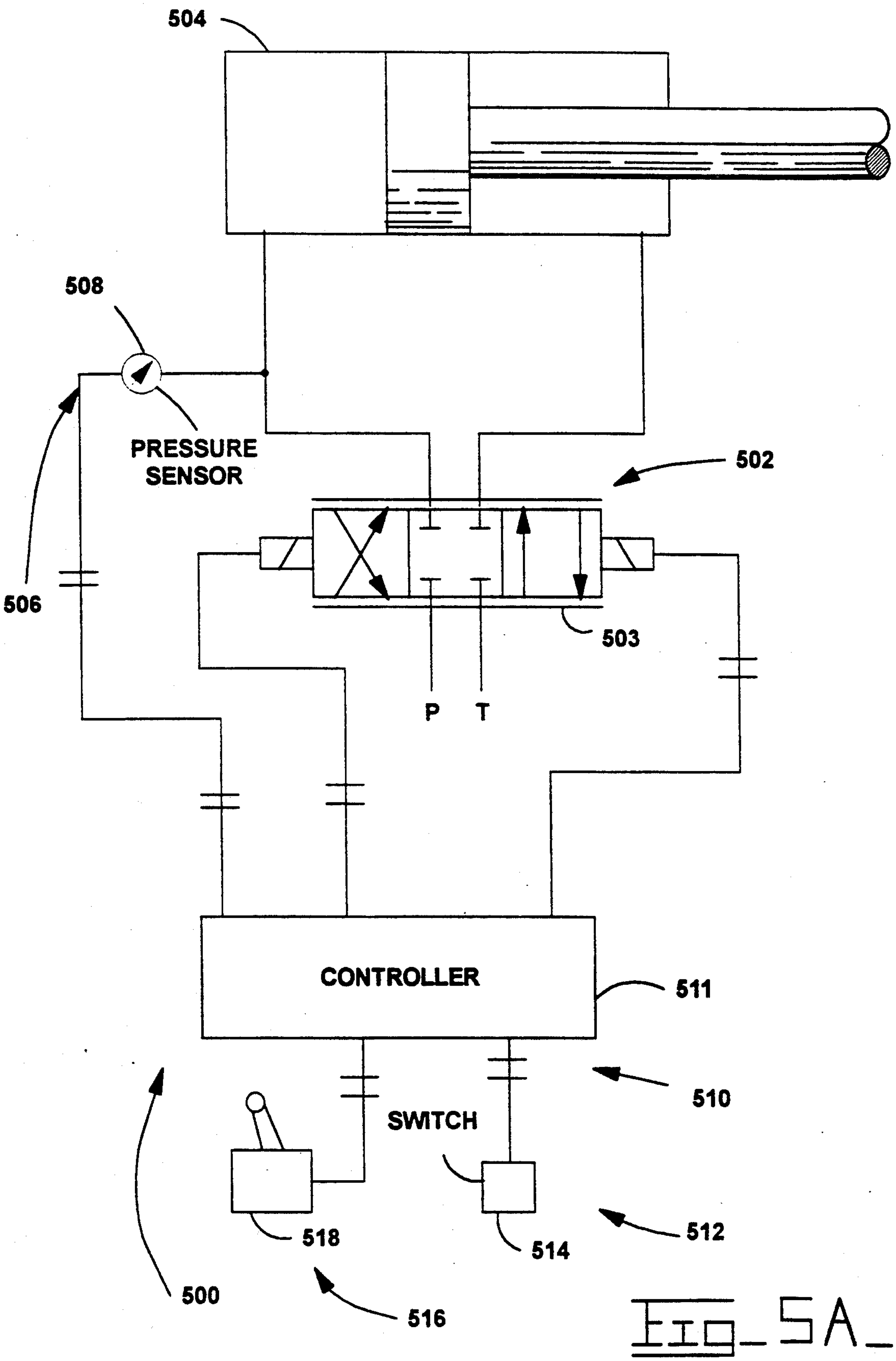
FIG. 5A is a stylized representation a hydraulic circuit with a hydraulic actuator, a closed center pressure compensated valve, and a controlling means, according to an embodiment of the present invention.

With reference to FIGS. 5A-6B, the present invention or apparatus is adapted to controllably give a closed center pressure compensated valve the operating characteristics or response of an open center valve. In FIGS. 5A and 5B, solid lines represent hydraulic lines, solid lines with cross marks represent electrical lines, and dashed lines represent pilot hydraulic lines. In one embodiment as shown in FIG. 5A, the solenoid 503 is an electrically actuated solenoid. In another embodiment as shown in FIG. 5b, the solenoid 503 is hydraulically actuated by a pilot valve.

A means 502 controllably provides pressurized hydraulic fluid to the hydraulic actuator 504. The means 502 includes a pressure compensated closed center valve 502.

A means 516 produces an operating signal. In the preferred embodiment, the operating signal producing means 516 includes an electronic control lever 518.

A means 512 produces a mode signal. In one embodiment, the mode signal producing means 512 includes a switch 514. The switch 514 has at least two positions and generates respective signals. The switch is controlled by the operator and indicates the desired response characteristics of the valve as nonpressure compensated or pressure compensated. In another embodiment, the mode signal producing means 512 includes a switch (not shown) to indicate operation in a manual or automatic mode.

A controlling means 510 receives the operating signal and the mode signal and responsively produces a command signal. In the preferred embodiment, the controlling means 510 includes a microprocessor-based controller 511.

The command signal actuates the valve 502 and thereby controls the flow of fluid to the hydraulic actuator 504 by moving the valve's spool. The valve is adapted such that the hydraulic fluid flow is linearly proportional to the command signal.

A means 506 senses the load pressure of the hydraulic actuator 504 and responsively produces a load pressure signal. In the preferred embodiment, the pressure sensing means 506 includes a pressure sensor 508.

If the mode indicating means 512 indicates that the valve is to be operated with the response characteristics of a nonpressure compensated valve, then the controller 510 receives the load pressure signal and responsively determines a gain signal. The command signal is then determined as a function of the gain signal and the operating signal.

If the mode indicating means 512 indicates that the valve is to be operated with the response characteristics of a pressure compensated valve, then the command signal is linearly proportional to the operating signal and is independent of the load signal.

Figure 5B:
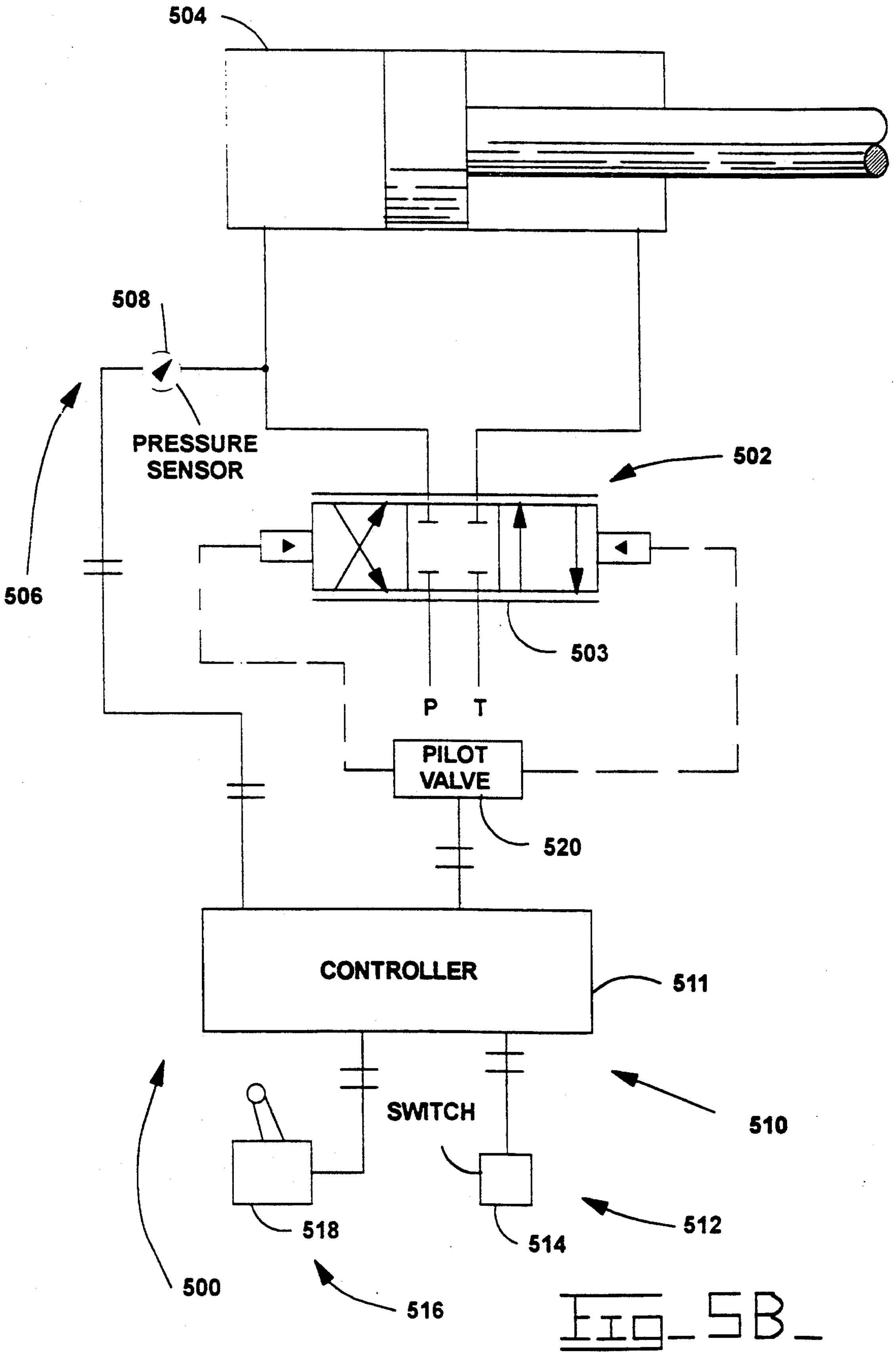
FIG. 5B is a stylized representation a hydraulic circuit with a hydraulic actuator, a pilot valve, a closed center pressure compensated valve, and a controlling means, according to another embodiment of the present invention.

With reference to FIG. 5B, the apparatus 500 is adapted to actuate a hydraulic actuator 504 using a pressure compensated valve and pilot valve arrangement 503/520. The apparatus 500 works in a similar manner as described above.

Figure 6A:
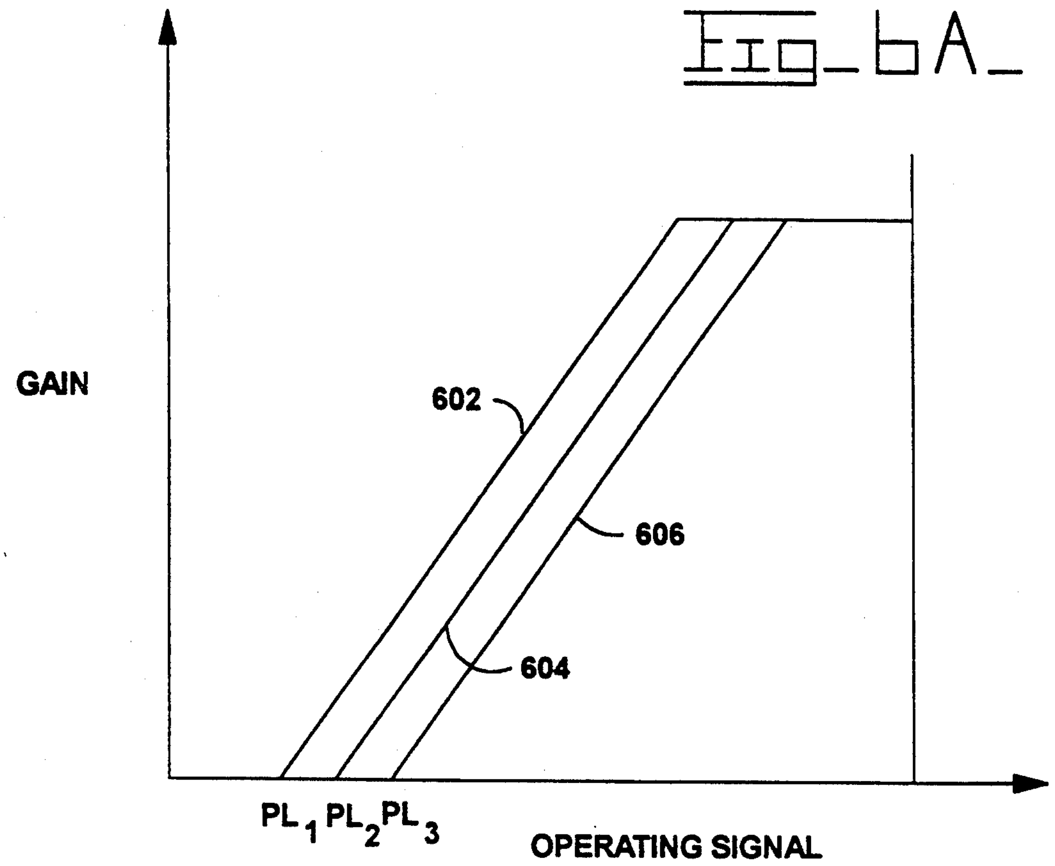
FIG. 6A is a graph of load dependent gain curves for use by the controlling means of FIGS. 5A and 5B, according to an embodiment of the present invention; and, FIG. 6B is a graph of load dependent gain curves for use by the controlling means of FIGS. 5A and 5B, according to another embodiment of the present invention.
Figure 6B:
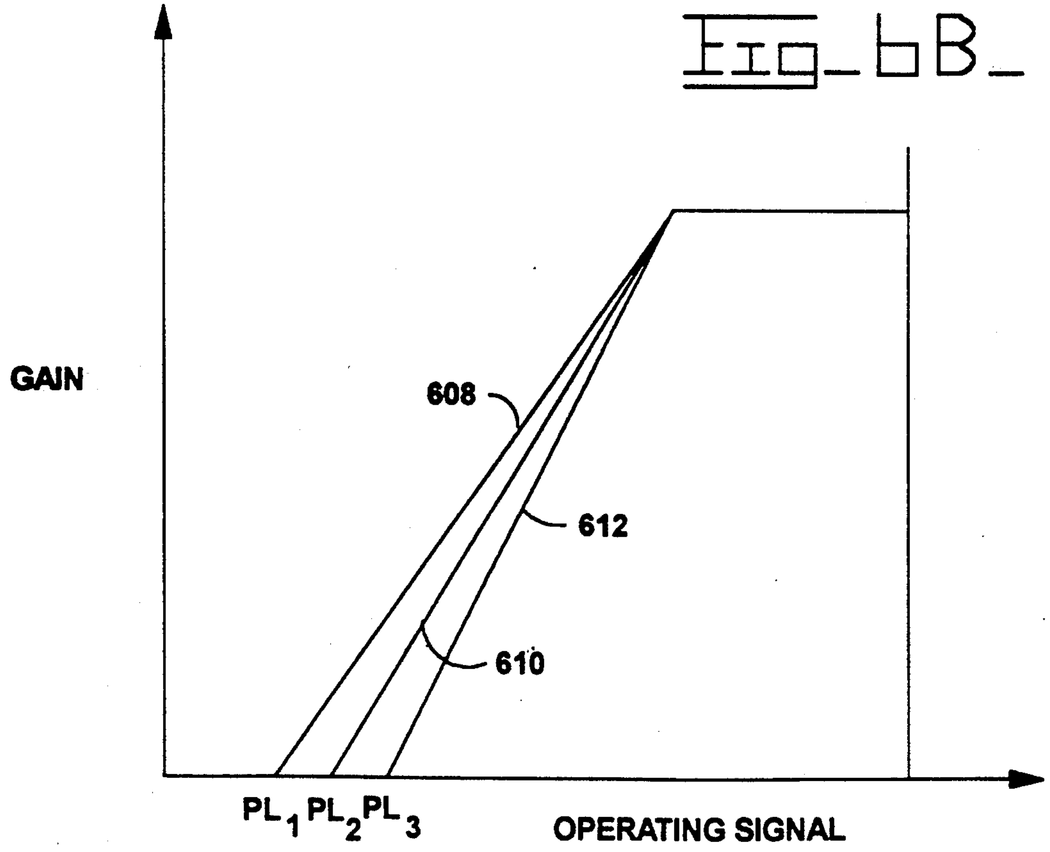

With reference to FIGS. 6A and 6B, in the preferred embodiment, the controller 511 stores a plurality of gain curves. For simplicity three gain curves are shown, but the present invention is not limited to any number. Each gain curve is associated with a predetermined load. The controller 511 is adapted to select a curve as a function of the load sensed by the load pressure sensing means 506. Using the selected curve, the controller 511 determines a gain as a function of the operating signal. The gain and the operating signal are then used to determine the command signal. The controller 511 may be further adapted to interpolate or extrapolate between curves to achieve a more precise gain.

The gain curves are constructed such that as the load on the actuator 504 varies, a different gain curve is selected. In one embodiment, the gain curves are linear. For example, as shown in FIG. 6A, the three gain curves 602,604,606 are linear and have the same slope. In another example, as shown by the three gain curves 608,610,612 in FIG. 6B, the gain curves may be linear with different slopes. Preferably, the gain curves are adapted such that the gain reaches a maximum value for a given operating signal or lever position for all loads. In FIGS. 6A and 6B, each curve corresponds to a given load; labeled: $PL_1$, $PL_2$, and $PL_3$, respectively. The three loads have the relationship:

$$PL_1 \leqq PL_2 \leqq PL_3.$$

For a given control lever position and operating signal, the gain signal is inversely proportional to the load. That is $G_1 \geqq G_2 \geqq G_3$, where $G_1$, $G_2$ and $G_3$ are the respective gain signals.

Industrial Applicability

With reference to the drawings and in operation, the present invention or apparatus 500 is adapted to controllably actuate a hydraulic actuator through a pressure compensated closed center control valve.

An operator identifies the desired mode of operation through a mode indicating means 512. The controlling means 510 is responsive to the mode indicating means 512 and controls the operation of the valve accordingly.

For example, the operator may indicate through the mode indicating means 512 that the response characteristics of a pressure compensated closed center valve is desired. In this scenario, the command signal is linearly proportional to the operating signal.

If the operator signals the controller that the operating characteristics of an open center nonpressure compensated valve is desired, the controller produces the command signal using the gain signal from the gain curves, as described above. In this manner, as the load on the actuator varies, so does the output of the valve 504.

Other aspect, objects, and features of the present invention can be obtained from a study of the drawings, the disclosure, and the appended claims.

We claim:

1. An apparatus for controllably actuating a hydraulic actuator, said apparatus being connected between a source of pressurized hydraulic fluid and said hydraulic actuator, comprising:

means for controllably providing pressurized hydraulic fluid to said hydraulic actuator;

means for producing an operating signal;

means for producing a mode signal, said mode signal having one of a set of values, said set having a least a first value;

means for sensing the load pressure of said hydraulic actuator and responsively producing a load pressure signal;

controlling means for receiving said operating signal, said load pressure signal, and said mode signal and responsively producing a command signal;

wherein said providing means includes means for receiving said command signal and responsively controlling the flow of hydraulic fluid to said hydraulic actuator, said providing means including a pressure compensated valve;

wherein said controlling means includes a plurality of selectable gain curves for determining a gain signal as a function of said load pressure signal and wherein said command signal is a function of said operating signal and said gain signal;

wherein said command signal is adapted such that said providing means has the operating characteristics of an open center non pressure compensated valve in response to said mode signal being equal to said first value.

2. An apparatus, as set forth in claim 1, wherein said gain signal is inversely proportional to said load pressure signal.

3. An apparatus, as set forth in claim 1, wherein said providing means includes a pilot valve.

4. An apparatus, as set forth in claim 1, wherein said operating signal producing means includes an operator control lever.

5. An apparatus, as set forth in claim 1, wherein said controlling means includes means for interpolating or extrapolating between curves.

6. An apparatus, as set forth in claim 1, wherein said gain curves are linear.

7. An apparatus, as set forth in claim 6, wherein said linear gain curves have the same slope.

8. An apparatus, as set forth in claim 6, wherein said gain curves have different slopes and reach a maximum value at a predetermined operating signal value.

* * * * *